United States Patent [19]
Gansky et al.

[11] Patent Number: 5,492,255
[45] Date of Patent: Feb. 20, 1996

[54] MULTI-FUNCTIONAL PACK FRAME ASSEMBLY

[76] Inventors: Alton E. Gansky, 4623 Bella Dr., Colorado Springs, Colo. 80918; William A. Harris, 1250 Paonia, Colorado Springs, Colo. 80915

[21] Appl. No.: 57,151

[22] Filed: May 5, 1993

[51] Int. Cl.$^6$ ..................................... A45F 4/02
[52] U.S. Cl. ................ 224/153; 224/210; 224/261; 297/129
[58] Field of Search ................... 224/153, 155, 224/210, 261, 151; 297/129, 174, 217

[56] References Cited

U.S. PATENT DOCUMENTS

| | | | |
|---|---|---|---|
| 3,241,734 | 3/1968 | Gray | 224/155 |
| 3,368,725 | 2/1968 | Martin | 224/155 |
| 4,300,707 | 11/1981 | Kjaer | 224/155 |
| 4,776,503 | 10/1988 | Sink | 224/153 |
| 4,836,938 | 6/1989 | Kobasic | 224/155 |
| 4,989,766 | 2/1991 | Lewallyn et al. | 224/155 |
| 5,105,910 | 4/1992 | Engstrom | 224/155 X |

FOREIGN PATENT DOCUMENTS 1469054  4/1975  United Kingdom ................ 297/129

*Primary Examiner*—Ernest G. Cusick
*Attorney, Agent, or Firm*—Phillip A. Rein

[57] ABSTRACT

A multi-functional pack frame assembly which can be assembled and disassembled while selectively functioning as 1) a backpack support assembly; 2) an adjustable chair assembly; 3) a gun rest assembly; and 4) a table assembly. The multi-functional pack frame assembly includes 1) a pack and ground support assembly; 2) a table and gun rest assembly connected to the pack and ground support assembly; 3) a back rest support assembly connectable to the pack and ground support assembly when functioning as a backpack support cushion or chair support member; 4) an adjustable elevation support assembly connectable to the pack and ground support assembly to provide adjustable elevational support thereto; and 5) a shoulder connector and support assembly connected to the pack and ground support assembly for attachment to shoulder portions of a camper/hunter member for conveyance thereof. The pack and ground support assembly provides a seat cushion member for functioning as a chair support member or a backpack support cushion. The table and gun rest assembly is a combination gun rest assembly and table member usable in selected interconnected conditions. The adjustable elevation support assembly includes a main support rod member connected to a support foot member and selectively connected to the pack and ground support assembly to provide an adjustable height function for support by the support foot member on an irregular terrain support surface.

21 Claims, 6 Drawing Sheets

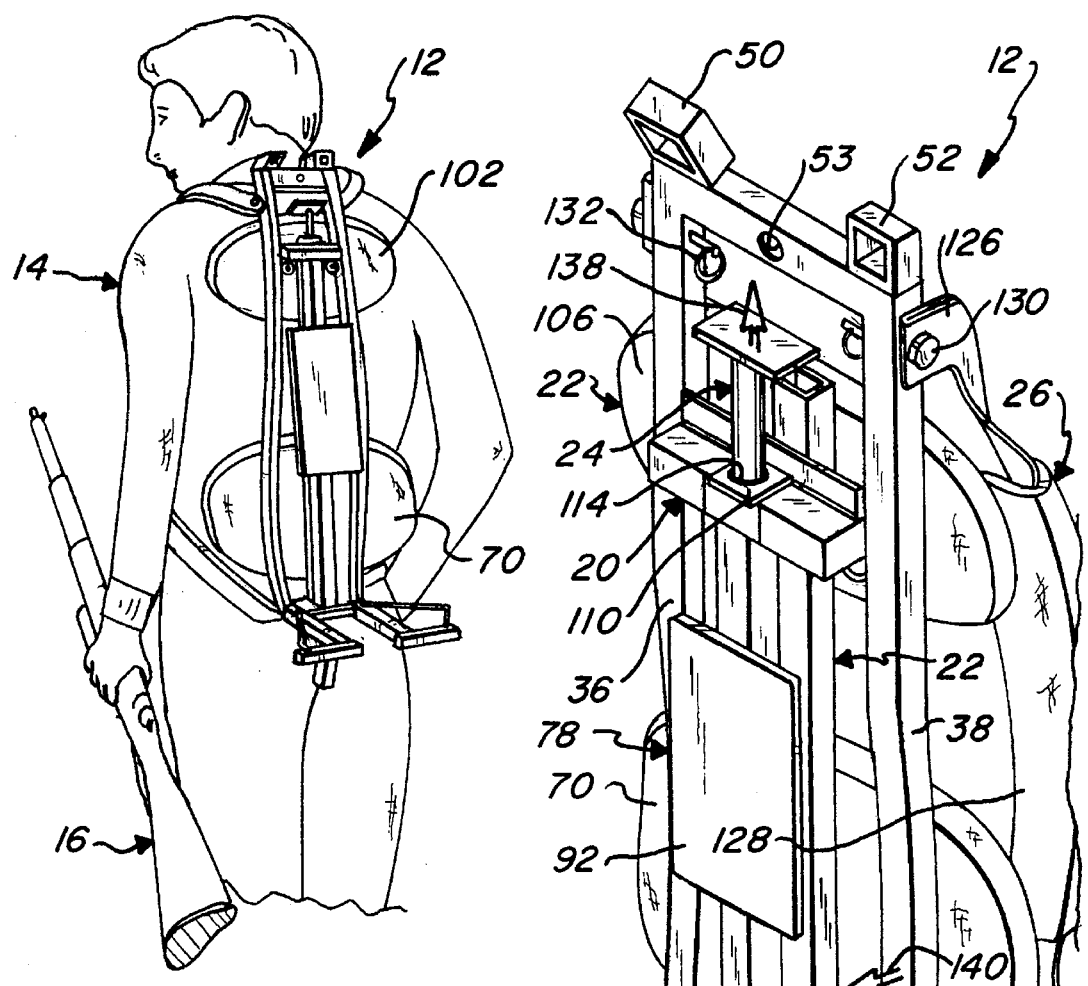
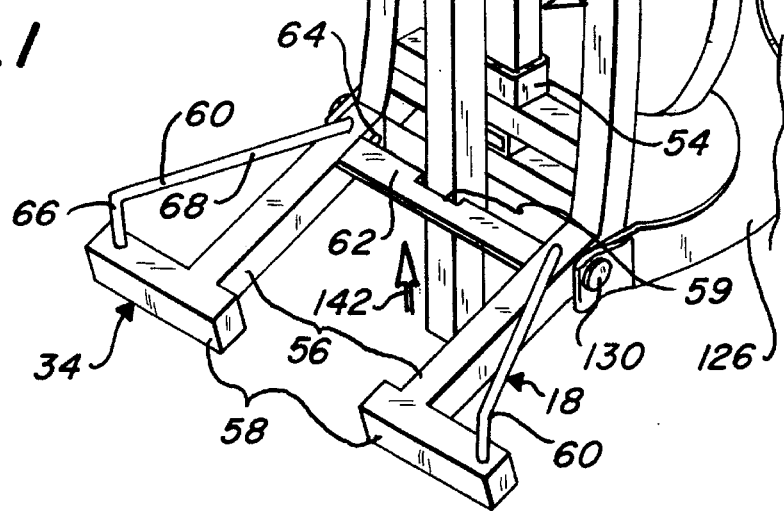
Fig_1
Fig_2

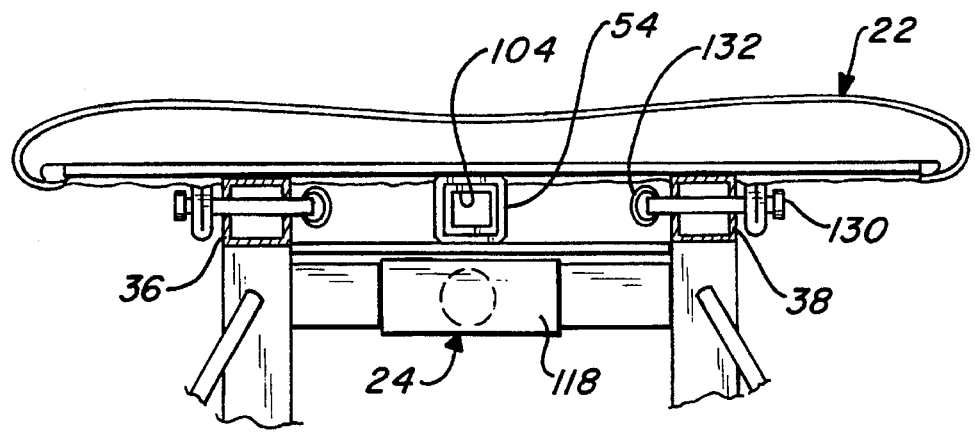
Fig_5
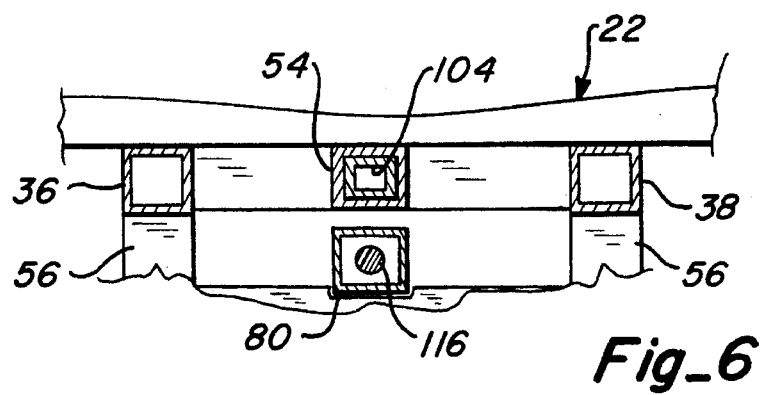
Fig_6
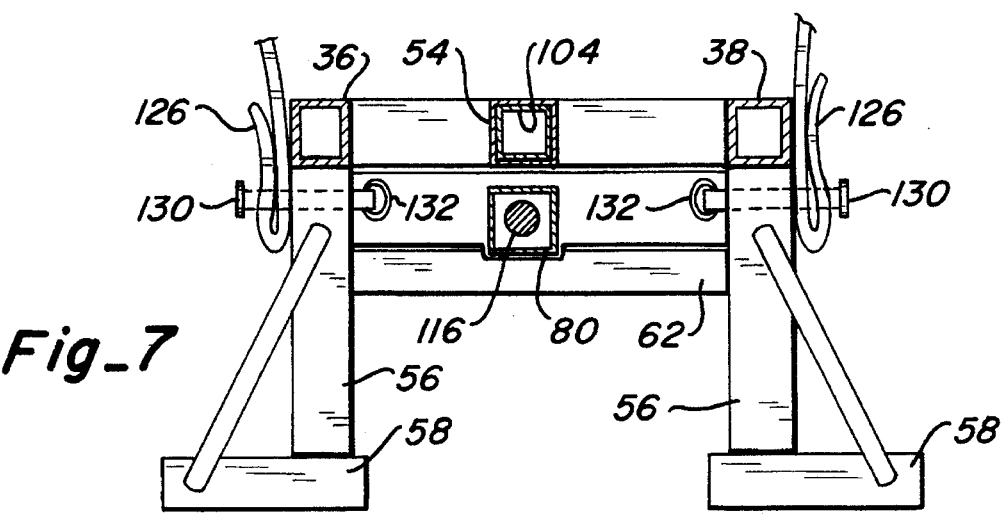
Fig_7

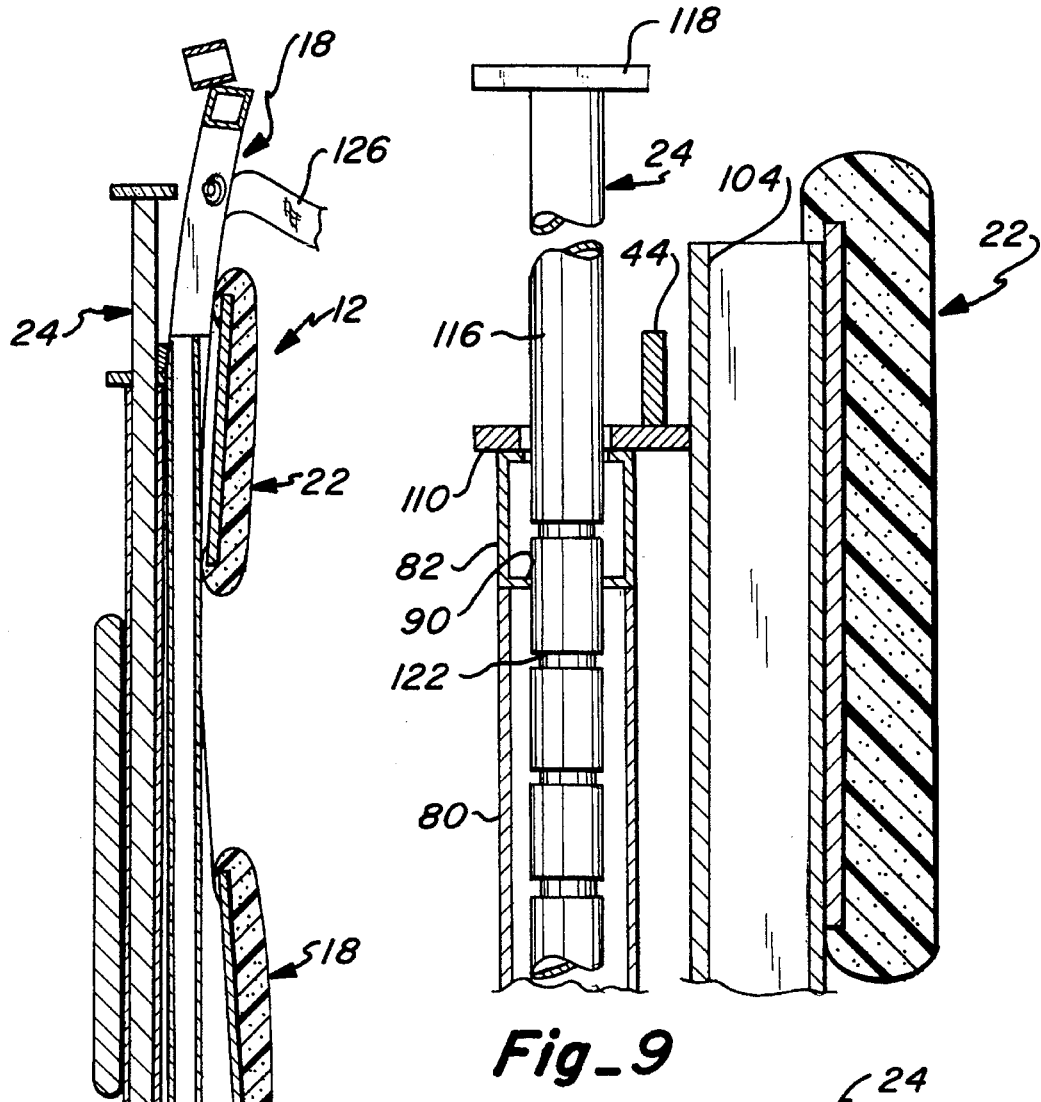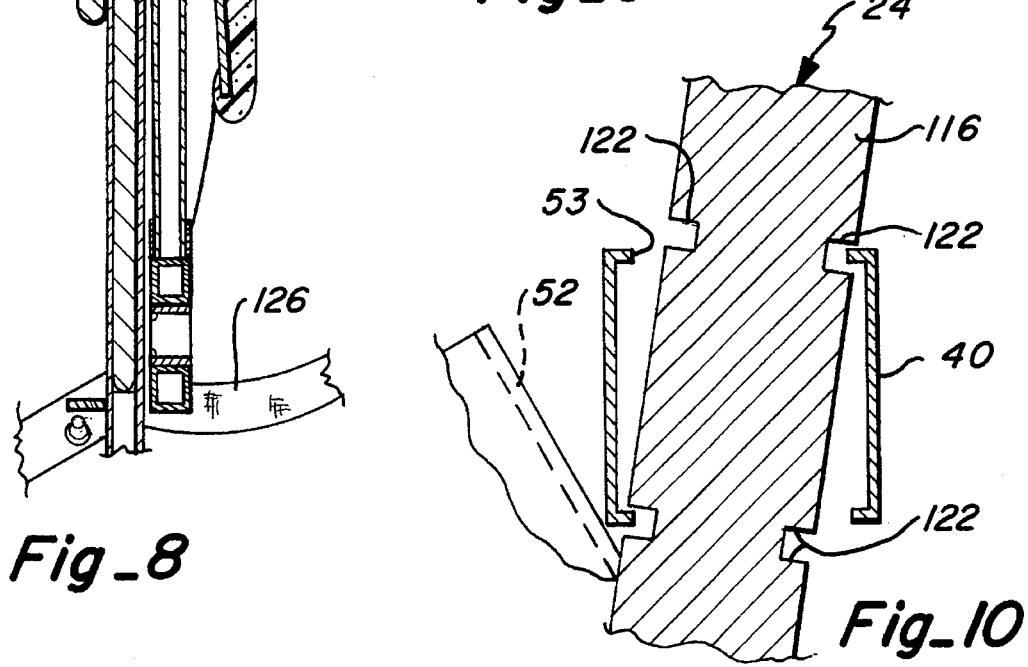

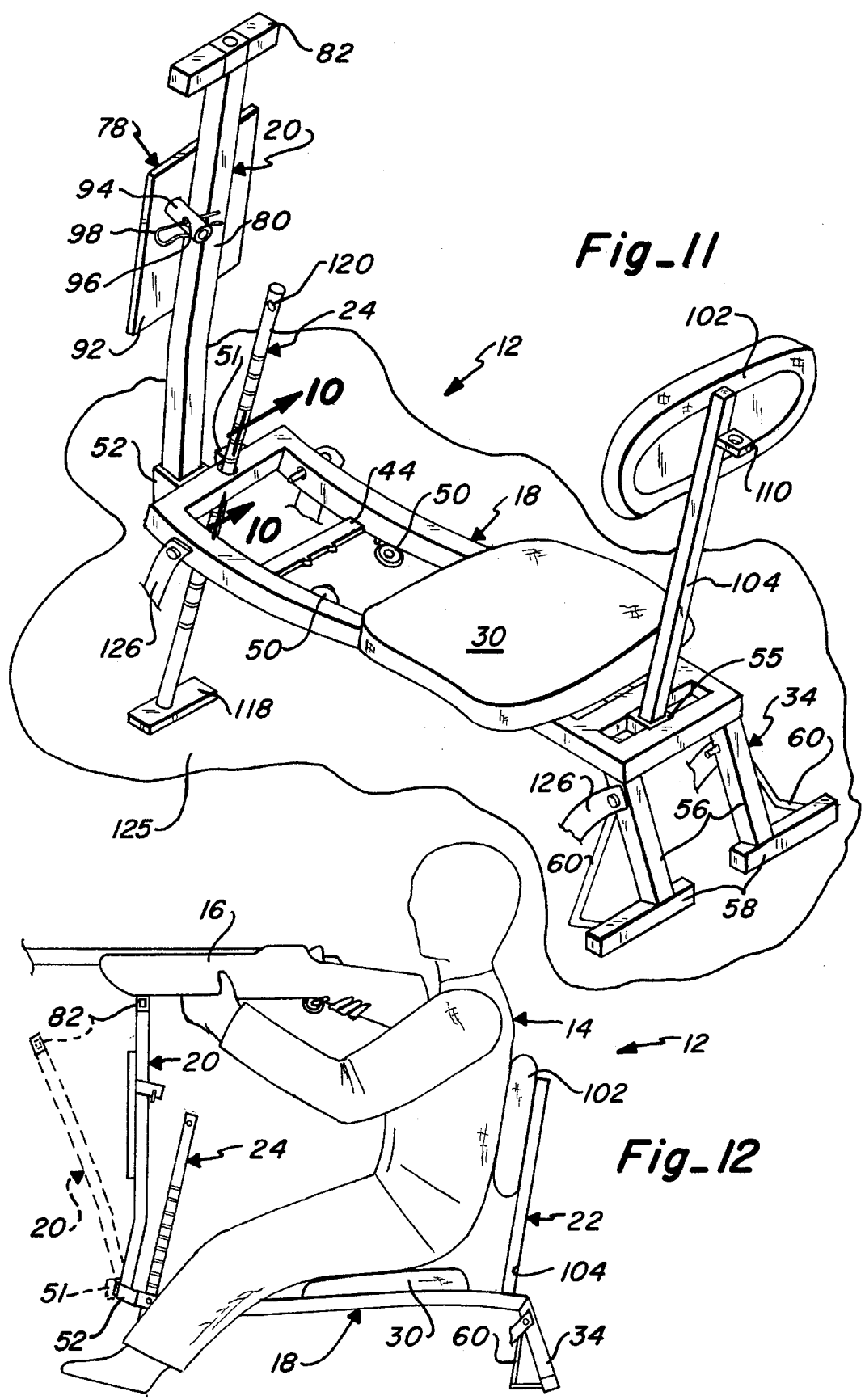

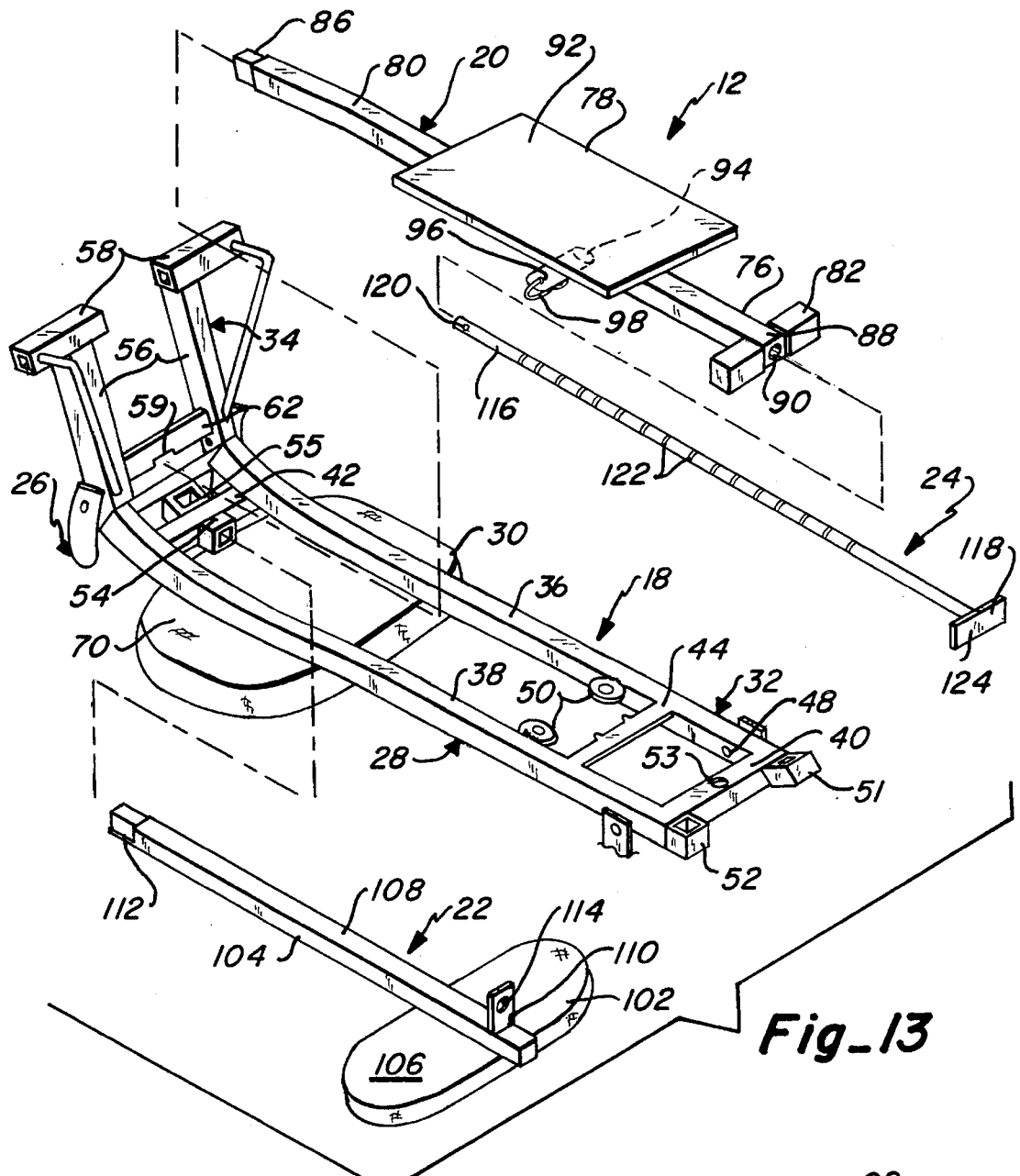
Fig_13
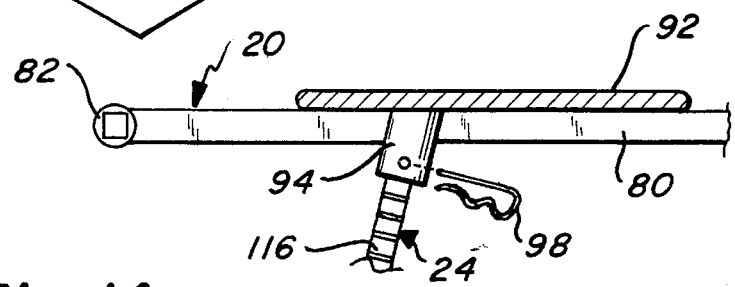
Fig_14

MULTI-FUNCTIONAL PACK FRAME ASSEMBLY

PRIOR ART

A United States patent search was not conducted on this invention.

PREFERRED EMBODIMENT OF THE INVENTION

In one preferred embodiment of this invention, a multi-functional pack frame assembly is utilized by a camper/hunter member in a conventional manner to receive and support a backpack member with hiking/camping supplies thereon and further utilized on being disassembled and converted into a combination chair, table, and gun rest structure for a multiple functional use thereof.

The multi-functional pack frame assembly includes 1) a pack and ground support assembly to receive and support the backpack member thereon and engagable with a support surface in the disassembled condition as a chair member function; 2) a table and gun rest assembly operable to provide a table member and means for stabilizing a gun member for hunting purposes; 3) a back rest support assembly connectable to the pack and ground support assembly to provide support against a back area of a user thereof in the backpack member function and provide back support when assembled into the chair function; 4) an adjustable elevation support assembly connected to the pack and ground support assembly to provide an adjustable vertical support means; and 5) a shoulder connector and support assembly connected to the pack and ground support assembly and operable to provide means for support and attachment to a shoulder area on the camper/hunter member in a conventional manner.

The pack and ground support assembly includes a main support frame assembly operable to have one end engage a support surface in the chair function condition and having a seat support cushion member connected thereto. The seat support cushion member includes a cushion member operable to receive the camper/hunter member thereon.

The main support frame assembly includes a plurality of receiver tube members and a support rod hole for use with other elements of the invention for use in the assembled chair function condition as will be explained.

The table and gun rest assembly includes a gun rest assembly having a main table assembly connected thereto. The gun rest assembly includes a tube support member having a gun rest member connected thereto and operable to be releasably supported on the main support frame assembly in a forward one of the receiver tube members. The height of the gun rest member can be varied on insertion of the tube support member in a second one of the receiver tube members.

The main table assembly includes a table member and a table support tube connected to the tube support member being operable to be placed in a horizontal position to support plates, silverware, fluid containers, and the like as so desired. The table support tube is releasably connectable to the adjustable elevation support assembly.

The back rest support assembly includes a back rest support member connected to a rest support tube member. The rest support tube member is operable to be selectively mounted in one of the receiver tube members in the main support frame assembly. In this condition, the back rest support member provides a back cushion member for contacting a back portion of the camper/hunter member thereof when functioning as a chair member.

The adjustable elevation support assembly includes a main support rod member having a support foot member connected thereto. The main support rod member is adjustably mounted in the support rod hole in the main support frame assembly in order to selectively adjust a horizontal positioning of the main support frame assembly. One end of the main support rod member is provided with a table connector hole used to releasably secure the table and gun rest assembly through the table support tube to place the table member in a generally horizontal plane when in the chair/table function condition.

The shoulder connector and support assembly includes shoulder support straps which are connected to the pack and ground support assembly and having shoulder cushion members for engaging the shoulder area of the camper/hunter member utilizing the same for transporting a backpack by the camper/hunter member in a known manner.

OBJECTS OF THE INVENTION

One object of this invention is to provide a multifunctional pack frame assembly presenting a conventional backpack support means for conveyance on the shoulder area of the camper/hunter member and being readily disassembled and reassembled to present a combination chair, gun rest, and table function.

Another object of this invention is to provide a multi-functional pack frame assembly readily conveyed on a shoulder back area of the camper/hunter member and being selectively operable to be disassembled and reassembled to present an adjustable chair member which can be utilized on various sloping degrees of terrain to present a generally horizontal support seat member.

One other object of this invention is to provide a multi-functional pack frame assembly including a seat support cushion member and a back cushion member to provide cushioning to the back area of the camper/hunter member during conveyance as a pack frame/backpack assembly and operable to be selectively disassembled and reassembled to provide a chair member utilizing the seat support cushion member and the back cushion member.

One further object of this invention is to provide a multi-functional pack frame assembly which is readily assembled in a compact backpack conveying assembly and further assembled as a combination chair, gun rest, and table assembly.

Still, one further object of this invention is to provide a multi-functional pack frame assembly which is compact in nature on being utilized as a backpack function; readily disassembled and assembled into a function as a chair support assembly; readily assembled with a table and gun rest assembly to provide functions of a support table or a gun rest; easy to disassemble and reassemble into the various multi-functional uses; economical to manufacture; and substantially maintenance free.

Various other objects, advantages, and features of the invention will become apparent to those skilled in the art from the following discussion, taken in conjunction with the accompanying drawings, in which:

FIGURES OF THE INVENTION

FIG. 1 is a perspective view of the multi-functional pack frame assembly of this invention as mounted on a shoulder/ back area by a camper/hunter member in a backpack conveyance condition;

FIG. 2 is a perspective view thereof;

FIG. 5 is an enlarged fragmentary sectional view taken along line 5—5 in FIG. 3;

FIG. 6 is an enlarged fragmentary sectional view taken along line 6—6 in FIG. 3;

FIG. 7 is an enlarged fragmentary sectional view taken along line 7—7 in FIG. 3;

FIG. 8 is an enlarged fragmentary sectional view taken along line 8—8 in FIG. 4;

FIG. 9 is an enlarged fragmentary sectional view taken along line 9—9 in FIG. 3;

FIG. 10 is an enlarged view of a portion of a locking feature of an adjustable elevation support assembly of this invention shown in FIG. 9;

FIG. 11 is a perspective view of the invention shown in an assembled chair and gun rest combination;

FIG. 12 is a reduced fragmentary side elevational view of the invention as shown in FIG. 11 with a camper/hunter member with a gun member supported on a chair assembly utilizing a table and gun rest assembly for hunting purposes;

FIG. 13 is an exploded perspective view thereof; and

FIG. 14 is a fragmentary perspective view of the invention being utilized in a table function.

Figure 4:
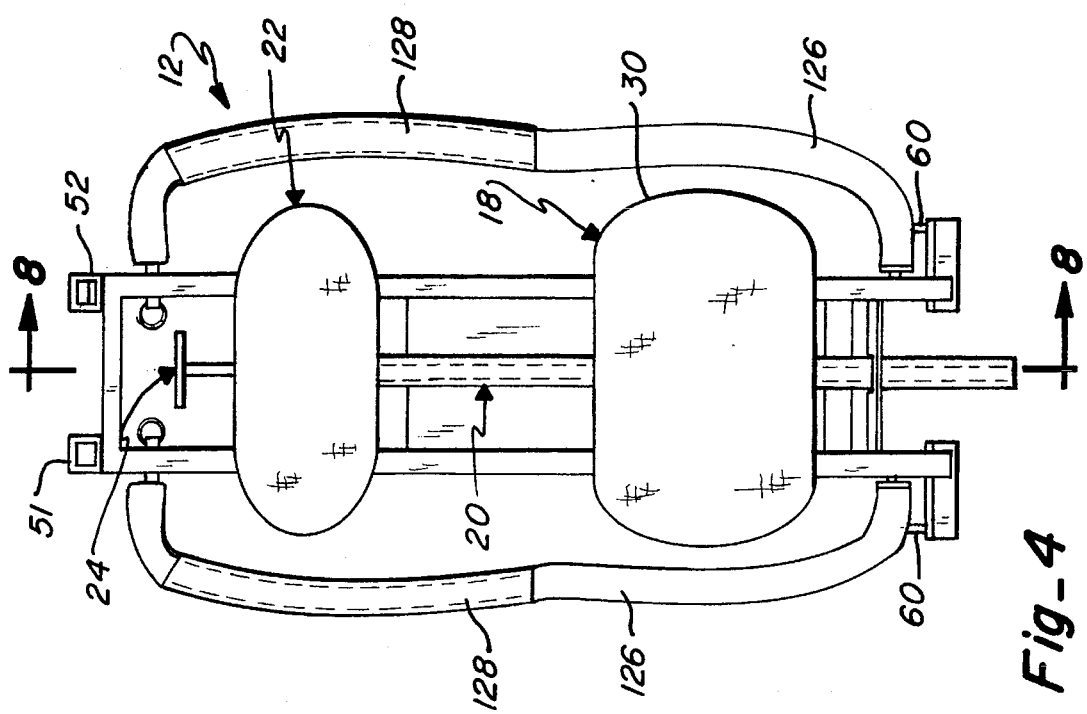
FIG. 4 is a front elevational view thereof.
Figure 3:
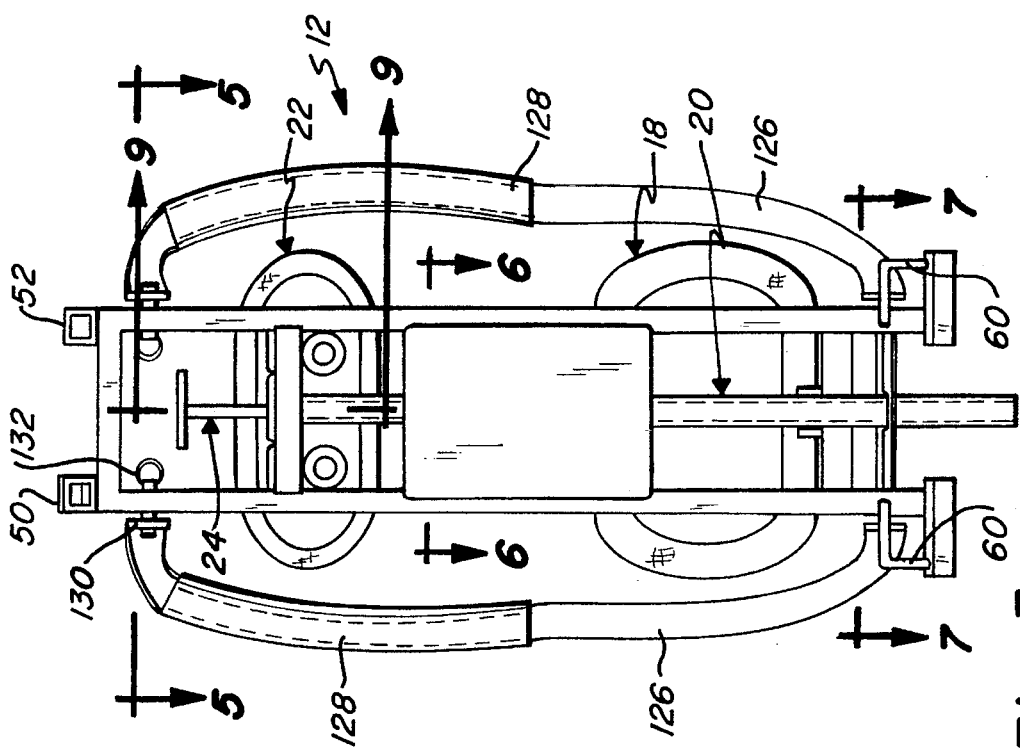
FIG. 3 is a rear elevational view thereof.

The following is a discussion and description of preferred specific embodiments of the multi—functional pack frame assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail, and in particular to FIG. 1, a multi-functional pack frame assembly of this invention, indicated generally at 12, is illustrated as being utilized by a camper/hunter member 14 carrying a gun member 16.

The multi-functional pack frame assembly 12 is to be utilized as a means for carrying hiking, camping, and/or hunting supplies or a game carcass as noted in FIG. 1 in a backpack assembly (not shown) and then is further utilized selectively as a combination chair, gun rest, and table assembly as noted in FIGS. 11, 12, and 14 as will be explained in detail.

In the assembled condition of FIG. 1 as a multi-functional pack frame assembly 12, it is noted that a pair of cushion members are provided for ease of carrying a camping supply load thereon or transporting game out of a hunting area after a successful hunting expedition.

The multi-functional pack frame assembly 12 includes 1) a pack and ground support assembly 18; 2) a table and gun rest assembly 20 selectively connectable to the pack and ground support assembly 18 to present a gun rest, table, or backpack support function; 3) a back rest support assembly 22 operable to provide support during a backpacking function and, additionally, as a back rest when assembled to the pack and ground support assembly 18 and acting as a chair function; 4) an adjustable elevation support assembly 24 operable to be connected to the pack and ground support assembly 18 to provide adjustable vertical support when in the chair function and acts as a locking feature when assembled in a backpack support function; and 5) a shoulder connector and support assembly or connector means 26 connected to the pack and ground support assembly 18 operable to be mounted on a shoulder area of the camper/hunter member 14 during a transport function (FIG. 1)

As noted in FIG. 13, the pack and ground support assembly 18 includes a main support frame assembly 28 having a seat support cushion member 30 connected thereto. The main support frame support 28 includes an arcuate support frame assembly 32 connected to a ground support assembly 34.

The arcuate support frame assembly 32 includes a pair of parallel arcuate support tube members 36, 38 interconnected by spaced transverse support tube members 40, 42 and a transverse support member 44.

Each arcuate support tube member 36, 38 is provided with strap connector holes 48; anchor tabs 50; a first receiver tube member 51; a second receiver tube member 52; a third receiver tube member 54; and a fourth receiver tube member 55. The receiver tube members 51, 52, 54, and 55 are of square tubular shape in transverse cross section and operable to receive and support various elements of the overall multi-functional pack frame assembly 12 as will be explained in detail.

The transverse support tube member 40 is provided with a support rod hole 53 to receive the adjustable elevation support assembly 24 therein when in a chair function as will be noted.

As shown in FIG. 1, the ground support assembly 34 includes a pair of parallel support leg members 56 interconnected by a transverse support plate 62 and to ground support members 58. A leveler support strut 60 is connected between the support leg members 56 and the respective ground support members 58.

The support leg members 56 and the ground support members 58 are tubular in shape in transverse cross section similar to the arcuate support frame assembly 32. Strength is added by the transverse support plate 62 having a notch 59 used in the backpack conveyance function. An inner end of the support leg members 56 are provided with a strap anchor hole 64 for connection to the shoulder connector and support assembly 26 as will be explained.

The leveler support struts 60 are of L-shape and having a short leg section 66 integral with a long leg section 68. The long leg section 68 is operable to be extended in a generally horizontal plane when worn as a pack frame function as noted in FIG. 1 to support a backpack thereon.

The seat support cushion member 30 is provided with a cushion member 70 secured by connector members or welding on the arcuate support tube members 36, 38.

The table and gun rest assembly 20 includes a gun rest assembly 76 having a main table assembly 78 secured thereto. The gun rest assembly 76 includes a tube support member 80 having a gun rest member 82 connected to one outer end thereof. The tube support member 80 is preferably of a hollow square tube configuration in transverse cross section operable to receive the adjustable elevation support assembly 24 therein in the assembled backpack condition of FIG. 2.

The tube support member 80 has a lower inclined portion provided with a stepped connector section 86. The connector section 86 is operable to be selectively placed within the first or the second receiver tube member 51 or 52 as noted in FIG. 11.

The gun rest member 82 is a square tubular member having a transverse tube member 88 provided with an anchor hole 90 therein utilized for assembly purposes into the pack frame function as noted in FIG. 1.

The main table assembly 78 includes a table member 92 having a table support tube 94 connected thereto. The table support tube 94 has an anchor hole 96 therein adapted to receive a hair clip pin member 98 therein for connection to the adjustable elevation support assembly 24 when in a table function as shown in FIG. 14.

As shown in FIG. 13, the back rest support assembly 22 includes a back rest support member 102 having a rest support tube member 104 connected thereto. The back rest support member 102 is a back cushion member 106 of oval shape which functions as a back rest in the chair function condition and as a cushion member against the back portion of the camper/hunter member 14 in the conveyance condition as noted in FIG. 1.

The rest support tube member 104 includes a main body section 108 having a laterally extended anchor lug 110 connected adjacent the back cushion member 106 and a reduced stepped end section 112 for connection to the fourth receiver tube member 55 when in the assembled condition as a chair member as noted in FIG. 11. The anchor lug 110 has an anchor hole 114 therein for compact assembly purposes when in the backpack condition as noted in FIG. 2.

As noted in FIG. 13, the adjustable elevation support assembly 24 includes a main support rod member 116 having a support foot member 118 secured to one end thereof. The main support rod member 116 is provided at one end with a table connector hole 120 and longitudinally provided with a plurality of opposed pairs of cooperating connector serrations 122. The connector serrations 122 are operable to provide an elevational support depending on which sets of connector serrations 122 are engaging opposed upper and lower edges of the support rod hole 53 in the transverse support tube member 40 when in the support condition as noted in FIG. 11.

The connector serrations 122 are parallel to each other and parallel to a longitudinal axis of the support foot member 118. This maintains the support foot member 118 parallel to the support tube member 40 when in the chair function as shown in FIG. 11.

The support foot member 118 is provided with a plate body section 124 operable to engage a support surface 125 in combination with the ground support assembly 34 for support thereof as noted in FIG. 11.

As shown in FIG. 2, shoulder connector and support assembly 26 is of a conventional nature having a pair of spaced shoulder support straps 126 each having a support cushion member 128 connected thereto. The shoulder support straps 126 are interconnected by cross straps (not shown) and secured to the main support frame assembly 28 through anchor pins 130 which are held in an anchored condition by lock rings 132 in a generally conventional manner.

USE AND OPERATION OF THE INVENTION

In the use and operation of the multi-functional pack frame assembly 12 of this invention, it is in the assembled backpack conveyance function as noted in FIGS. 1 and 2. The multi-functional pack frame assembly 12 is connected to the back and shoulder area of the camper/hunter member 14 through use of the shoulder connector and support assembly 26 in a generally conventional manner.

The leveler support struts 60 are operable to provide the spaced long leg sections 68 acting as a horizontal support for a backpack assembly (not shown) to be secured thereto through use of connector straps (not shown).

On reaching a camping or hunting site and removing the multi-functional pack frame assembly 12 from the shoulders of the camper/hunter member 14, the first step is to disassemble the multi-functional pack frame assembly 12 for reassembling into the chair, table, and gun rest functions as noted collectively in FIGS. 11, 12, and 14.

More specifically, the adjustable elevation support assembly 24 is moved upwardly as noted by an arrow 138 in FIG. 2 to remove the same from interlocking condition with the table and gun rest assembly 20 within the anchor hole 114 in the anchor lug 110.

Next, the table and gun rest assembly 20 is removed from its condition of FIG. 2 by pivoting outwardly as noted by an arrow 140 in FIG. 2. The table and gun rest assembly 20 can be moved upwardly as noted by an arrow 142. This releases a binding condition of a lower end of the tube support member 80 between the transverse support plate 62 and the support tube member 42.

Then, the back rest support assembly 22 is operable to be released from the assembled condition of FIG. 2 so that the elements are independently separable as noted in the exploded perspective view of FIG. 13. More specifically, the reduced stepped end section 112 is moved upwardly to be released from the third receiver tube member 54.

Then, to proceed with assembly to the condition of FIG. 11, the adjustable elevation support assembly 24 and, namely, the main support rod member 116, is inserted within the support rod hole 53 in the transverse support tube member 40.

The main support rod member 116 is operable to be tilted and moved longitudinally within the support rod hold 53 in order to place the cushion member 70 of the pack and ground support assembly 18 in a generally horizontal position. This can be readily locked into an adjusted position due to contact of the cooperating connector serrations 122 with opposed inner edges of the support rod hole 53 as noted in FIG. 10.

Due to this adjustment feature, the main support frame assembly 28 and the cushion member 70 can be placed in a generally horizontal position regardless of an irregular, inclined support surface 125 and the plate body section 124 is operable to contact the support surface 125.

Then, the back rest support assembly 22 is operable to be mounted within the fourth receiver tube member 55 as noted in FIG. 11.

Next, the table and gun rest assembly 20 is operable to have its lower connector section 86 mounted within the second receiver tube member 52 as noted in FIG. 11. In this condition, the camper/hunter member 14 can rest on the seat support cushion member 30 and the back cushion member 106. In this position, the camper/hunter member 14 can place a portion of its gun member 16 on the table and gun rest assembly 20 and, more particularly, on the gun rest member 82 for a game hunting function as noted in FIG. 12.

As noted in FIG. 14, the table and gun rest assembly 20 can be removed from the second receiver tube member 52 and placed within the third receiver tube member 54 to achieve a different level of support for the gun member as shown in dotted lines.

The table and gun rest assembly 20 can be selectively removed from the second and third receiver tube members 52, 54 to operate in a table function. More particularly, as noted in FIG. 14, the table and gun rest assembly 20 is placed in a generally horizontal plane with the table support tube 94 mounted on and about an upper end of the support rod member 116. The hair clip pin member 98 is then inserted through the aligned anchor hole 96 and the table connector hole 120 to hold in an anchored condition. The table member 92 is in a preferred horizontal plane and can be used for obvious functions.

After use of the multi-functional pack frame assembly 12 as chair, gun rest, and table functions, it can thereupon be disassembled and reassembled to be a backpack support function, as noted in FIG. 2. The steps for reassembling would follow in reverse the steps previously described for disassemble from the status as noted in FIG. 2 for accomplishing a backpacking function to convey a backpack or game thereon at a remote camping or hunting location.

It is seen that the multi-functional pack frame assembly of this invention is easy to assemble and disassemble; economical to manufacture; rigid in construction; and substantially maintenance free.

While the invention has been described in conjunction with preferred specific embodiments thereof, it will be understood this description is intended to illustrate and not to limit the scope of the invention, which is defined by the following claims:

I claim:

1. A multi-functional pack frame assembly operable to be assembled in a backpack support function and subsequently disassembled and reassembled into chair, gun rest, and table functions for use by a camper/hunter member, comprising:
   a) a pack and ground support assembly including a main support frame assembly having a seat support cushion member connected thereto;
   b) said seat support cushion member positioned to engage a lower back portion of the camper/hunter member when in a backpack function;
   c) a back rest support assembly releasably connected to said main support frame assembly and having a back cushion member positioned to engage an upper back portion of the camper/hunter member when in backpack function; and
   d) user connector means connected to said main support frame assembly and operable to be releasably connected to a back and shoulder area of the camper/hunter member.

2. A multi-functional pack frame assembly as described in claim 1, wherein:
   a) said main support frame assembly includes an arcuate frame assembly connected at one end to a laterally extended ground support assembly;
   b) said ground support assembly having ground support members to engage a support surface and a leveler support strut connected to a respective one of said ground support members; and
   c) said leveler support struts each having a leg section operable to be extended horizontally in the backpack function condition to receive and hold a backpack assembly thereon for conveyance purposes.

3. A multi-functional pack frame assembly as described in claim 1, including:
   a) a table and gun rest assembly connected to said pack and ground support assembly;
   b) an adjustable elevation support assembly connected to said back rest support assembly and said table and gun rest assembly in an assembled pack frame condition to hold said adjustable elevation support assembly adjacent said main support frame assembly to provide a compact structure for the backpack function.

4. A multi-functional pack frame assembly as described in claim 3, wherein:
   a) said back rest support assembly includes a rest support tube connected to said back cushion member;
   b) said rest support tube member having an anchor lug extended laterally therefrom;
   c) said table and gun rest assembly connected to said main support frame assembly;
   d) said table and gun rest assembly includes a gun rest assembly having a tube support member connected to a gun rest member;
   e) said gun rest member includes a main tube member having an anchor hole therein; and
   f) said adjustable elevation support assembly having a main support rod assembly mounted through an anchor hole in said anchor lug and through said anchor hole in said main tube member to provide a locking feature to anchor said adjustable elevation support assembly in the assembled pack frame condition.

5. A multi-functional pack frame assembly as described in claim 1, wherein:
   a) said back rest support assembly having a back rest support tube member mounted within a receiver tube member on said main support frame assembly to hold said back rest support assembly in an upright condition and prevent lateral movement of said back rest support assembly when in an assembled pack frame condition.

6. A multi-functional pack frame assembly comprising:
   a) a pack and ground support assembly adapted to support a load thereon when in a backpack support function;
   b) a table and gun rest assembly releasably connected to said pack and ground support assembly providing a lateral support to the load mounted on said pack and ground support assembly;
   c) a back rest support assembly having a support member releasably connected to said pack and ground support assembly and said support member providing lateral support to a back portion of a camper/hunter member when in the backpack support function; and
   d) an adjustable elevation support assembly releasably connected to said table and gun rest assembly and said back rest support assembly and operably connected to said pack and ground support assembly to present a compact assembly when in the backpack support function.

7. A multi-functional pack frame assembly as described in claim 6, wherein:
   a) said pack and ground support assembly includes a main support and frame assembly having a seat support cushion member connected thereto; and
   b) said seat support cushion member mounted on a forward portion of said pack and ground support assembly in order to provide a cushion to a back portion of a camper/hunter member when utilized in the backpack support function.

8. A multi-functional pack frame assembly as described in claim 6, wherein:
   a) said pack and ground support assembly includes a main support frame assembly having a cushion member connected thereto; and
   b) said cushion member providing lateral support to another back portion of the camper/hunter member in the backpack support function.

9. A multi-functional pack frame assembly as described in claim 6, wherein:
   a) said adjustable elevation support assembly includes a main support rod member having a support foot member connected at one end thereof; and
   b) said main support rod member is connected to said back rest support assembly and said table and gun rest assembly in the backpack support function to anchor against vertical and lateral movement.

10. A multi-functional pack frame assembly as described in claim 6, wherein:
   a) said table and gun rest assembly having a gun rest assembly with a main table assembly connected thereto; and
   b) said main table assembly having a table member positioned vertically when in the backpack support function and operable to provide support to a backpack assembly being conveyed thereon.

11. A multi-functional pack frame assembly operable to be disassembled from a backpack function and reassembled into a chair, gun rest, and table function condition, comprising:
   a) a pack and ground support assembly including a main support frame assembly having a seat support cushion member connected thereto;
   b) a back rest support assembly connected to said pack and ground support assembly having a back rest support member positioned to cooperate with said seat support cushion member to achieve a chair function; and
   c) an adjustable elevation support assembly adjustably connected to said pack and ground support assembly to raise and lower an inclined position thereof;
   whereby said adjustable elevation support assembly is operable to raise and lower said main support frame assembly to maintain said seat support cushion member in a generally horizontal plane when used on an inclined support surface such as a hillside.

12. A multi-functional pack frame assembly as described in claim 11, wherein:
   a) said main support frame assembly includes an arcuate frame assembly connected to a ground support assembly; and
   b) said ground support assembly connected at one end of said arcuate frame assembly and extended laterally therefrom to be supported on a support surface.

13. A multi-functional pack frame assembly as described in claim 12, wherein:
   a) said seat support cushion member is connected adjacent the junction of said arcuate frame assembly and said ground support assembly; and
   b) said adjustable elevation support assembly adjustably connected to an opposite end of said ground support assembly being operable to pivot said opposite end upwardly or downwardly to adjust a horizontal positioning of said seat support cushion member for use on inclined hillsides.

14. A multi-functional pack frame assembly as described in claim 11, including:
   a) a table and gun rest assembly releasably connected to said main support frame assembly and extended upwardly therefrom; and
   b) said table and gun rest assembly includes a gun rest assembly having a tube support member connected to said main frame support assembly and a gun rest member connected to an upper outer end of said tube support member;
   whereby said gun rest member is operable to receive a gun member utilized by a camper/hunter member in a game hunting function.

15. A multi-functional pack frame assembly as described in claim 14, wherein:
   a) said tube support member is movable to a second adjustable position on said main support frame assembly to lower a vertical positioning of said gun rest member according to desires of the camper/hunter member utilizing the invention in the game hunting function.

16. A multi-functional pack frame assembly as described in claim 15, wherein:
   a) said table and gun rest assembly includes a main table assembly secured to said tube support member; and
   b) said tube support member operable to be mounted on said adjustable elevation support assembly being releasably connected thereto and operable to present said main table assembly in a generally horizontal position for use by the camper/hunter member for a table function condition.

17. A multi-functional pack frame assembly as described in claim 11, wherein:
   a) said adjustable elevation support assembly includes a main support rod member having a support foot member connected thereto; and
   b) said main support rod member is adjustably and releasably connected to a portion of said main frame assembly and operable to have said support foot member contacting a support surface to provide for pivotal adjustable movement of said main support frame assembly to maintain said seat support cushion member in a generally horizontal condition for comfort and usage by a camper/hunter member.

18. A multi-functional pack frame assembly as described in claim 11, wherein:
   a) said main support frame assembly having a receiver tube member thereon to releasably receive said back rest support assembly therein; and
   b) said main support frame assembly having a support rod hole to adjustably receive said adjustable elevation support assembly therein for vertical adjustment to place said seat support cushion member in a generally horizontal plane.

19. A multi-functional pack frame assembly as described in claim 11, including:
   a) a table and gun rest assembly releasably connectable to said main support frame assembly having an elevated gun rest member to support a gun member thereon by a camper/hunter member utilizing this invention; and
   b) said main support frame assembly having first and second receiver tube members positioned at different angles to each other and selectively operable to receive a portion of said table and gun rest assembly therein to provide various elevations of said gun rest member for various needs of the camper/hunter member utilizing said gun rest member in a hunting function.

20. A multi-functional pack frame assembly as described in claim 19, wherein:
   a) said table and gun rest assembly includes a gun rest assembly having a tube support member with one end connectable to said main support and frame assembly and the other end having a gun rest member mounted thereon;

b) a main table assembly connected to said tube support member; and c) said table and gun rest assembly operable to be releasably connected to said adjustable elevation support assembly to place said main table assembly in a generally horizontal plane to operate as a support member for various elements utilized by the camper/hunter member, such as food, beverages, and note pads.

21. A multi-functional pack frame assembly operable to be assembled in a backpack support function and subsequently disassembled and reassembled into chair, gun rest, and table functions for use by a camper/hunter member, comprising:

a) a pack and ground support assembly including a main support frame assembly having a seat support cushion member connected thereto;

b) said seat support cushion member positioned to engage a lower back portion of the camper/hunter member when in the backpack support function;

c) a back rest support assembly releasably connected to said main support frame assembly and having a back cushion member positioned to engage an upper back portion of the camper/hunter member when in the backpack support function;

d) user connector means connected to said main support frame assembly and operable to be releasably connected to a back and shoulder area of the camper/hunter member;

e) a table and gun rest assembly releasably connected to said pack and ground support assembly providing a lateral support to a load mounted on said pack and ground support assembly;

f) an adjustable elevation support assembly releasably connected to said table and gun rest assembly and said back rest support assembly and operably connected to said pack and ground support assembly to present a compact assembly when in the backpack support function; and g) an adjustable elevation support assembly adjustably connected to said pack and ground support assembly to raise and lower an inclined position thereof;

whereby said adjustable elevation support assembly is operable to raise and lower said main support frame assembly to maintain said seat support cushion member in a generally horizontal plane when used on an inclined support surface such as a hillside.

* * * * *